Feb. 12, 1952     W. A. BEDFORD, JR     2,585,728

NUT RETAINER

Filed June 2, 1949

INVENTOR:
WILLIAM A. BEDFORD JR.
By John Todd
ATTORNEY.

Patented Feb. 12, 1952

2,585,728

UNITED STATES PATENT OFFICE 2,585,728

NUT RETAINER

William A. Bedford, Jr., North Scituate, Mass., assignor to United-Carr Fastener Corporation, Cambridge, Mass., a corporation of Massachusetts Application June 2, 1949, Serial No. 96,658

7 Claims. (Cl. 151—41.76)

This invention relates to fastener assemblies which are adapted for engagement with a supporting wall over an opening therein, and has particular reference to such an assembly which comprises a cage member and a nut member assembled in the cage.

The object of the invention is to provide a caged nut fastener assembly in which the cage is provided with means for engaging a supporting panel on opposite sides of an opening therein, and means for retaining a nut over the opening in non-rotative relationship.

A further object of the invention is to provide a cage member and a nut member assembled therein in which the cage member has means for engaging nut corners to prevent rotation of the nut in the cage.

A still further object of the invention is to provide a caged nut assembly in which the cage member has means for engaging diagonally opposite corners of a square nut to prevent rotation of the nut in the cage.

A further object of the invention is to provide a caged nut assembly in which a horizontal portion of the cage extending across the top of the nut is provided with means for engaging the threads of a bolt inserted into the nut to provide a friction lock therebetween.

A further object of the invention is to provide a caged nut assembly which is adapted to engage the edges of a square opening in a supporting panel, in which the cage member has means for engaging diagonally opposite corners of a square nut so that the nut is disposed in the cage diagonally to the square opening.

Other objects of the invention will, in part, be obvious, and will, in part, appear hereinafter.

For a fuller understanding of the nature and objects of the invention, reference should be had to the following detailed description, taken in conjunction with the accompanying drawing, in which.

Figure 1:
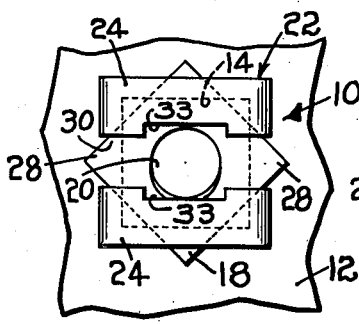
Fig. 1 is a plan view of the preferred embodiment of the invention in which the cage member is provided with attaching hooks for engagement with an opening in a supporting panel.
Figure 2:
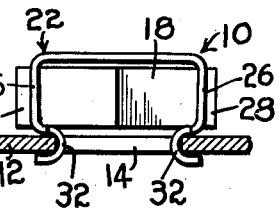
Fig. 2 is a side view in elevation, partly in section, of the nut assembly of Fig. 1.
Figure 3:
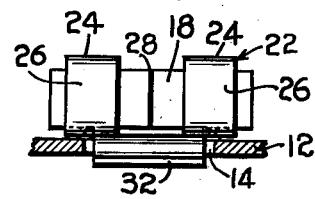
Fig. 3 is an end view in elevation of the nut assembly of Fig. 2.
Figure 4:
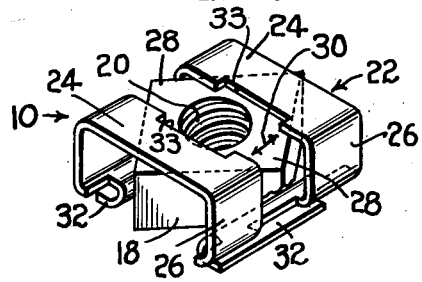
Fig. 4 is a perspective view of the nut assembly of Fig. 1.

Referring to the drawing, there is illustrated a caged nut assembly 10, which is adapted to be assembled on a supporting panel 12 over an opening 14 therein, to receive a bolt 16. The caged nut assembly 10 comprises a nut 18, having a threaded opening 20 disposed therein, and a cage member 22 disposed about the nut to retain it therein in non-rotative relationship.

In the preferred embodiment, as illustrated in Figs. 1-5, the cage member 22 comprises a pair of spaced straps 24 which are disposed diagonally across the top of the nut on opposite sides of the opening 20, a pair of spaced arms 26 extending downwardly from adjacent ends of the spaced straps, and support panel engaging means disposed on the lower portion of the spaced arms below the nut, as will be more fully described hereinafter. The nut 18 is preferably square, and is so assembled in the cage that diagonally opposite corners 28 project into the opening or space 30 between the pair of spaced arms 26, to prevent rotation of the nut relative to the cage when the bolt is inserted into the nut.

The means of attaching the cage member to the supporting panel will depend on the particular application in which the assembly is to be used. As illustrated in Figs. 1-5, the cage may be provided with hook members 32 on the lower portion of each pair of spaced arms 26, for engagement with opposite edges of the opening 14. The cage member 22 is preferably made of resilient sheet metal which permits inward flexing of the arms to allow the hooks to be engaged in the opening.

Figure 5:
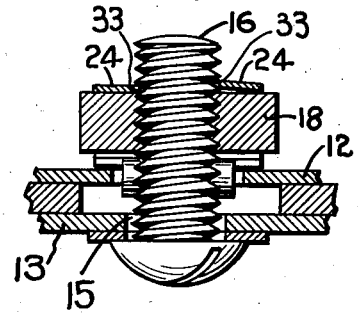
Fig. 5 is an end view partly in section of the nut assembly of Fig. 1 and an assembled bolt.

In the assembly of panels by means of the nut of the invention, as illustrated in Fig. 5, it is sometimes found that the opening 14 in the panel 12 is not in exact alignment with the corresponding opening 15 in the panel 13, which results in the bolt 16 being out of alignment with the nut 18. In such cases it is desirable that the nut 18 be movable relative to the bolt 16 to compensate for such misalignment. Consequently, in the preferred embodiment, the nut is loosely disposed in the cage by providing the proper relative dimensions therebetween, to allow slight lateral movement of the nut in a direction parallel to the direction of the straps 24, and the hook members 32 are constructed so as to be shorter than the length of a side of the opening 14. In this manner alignment of the nut with the bolt in a direction parallel to the spaced straps is accomplished by lateral shifting of the nut in the cage, and alignment in a direction perpendicular to the spaced straps is accomplished by shifting the cage in the opening.

A friction lock may be provided between the bolt and the cage by so spacing the straps 24 that the distance between the inner edges 33 is slightly less than the diameter of the bolt to be inserted into the nut. As illustrated in Fig. 5 with this construction, the threads of an inserted bolt frictionally engage the edges 33, which causes slight deformation of the straps 24 to conform to the position of the threads. The insertion of the bolt also causes slight spreading of the straps and the resilient arms 26, which insures tight frictional engagement with the threads to prevent loosening of the bolt due to vibration.

Figure 6:
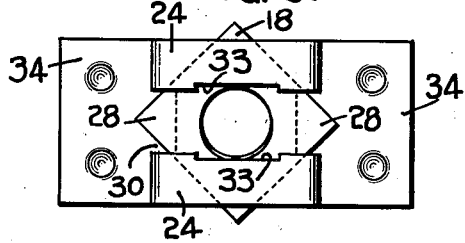
Fig. 6 is a plan view of the caged nut assembly of the invention in which the cage member is provided with supporting plates for attaching to a supporting panel.
Figure 7:
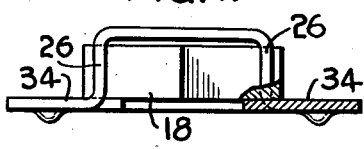
Fig. 7 is a side view in elevation of the nut assembly of Fig. 6.

Referring now to Figs. 6 and 7, there is illustrated another means of attaching the caged nut to the panel. In this embodiment, a support plate 34 is provided on the lower portion of each pair of spaced arms 26, and each plate 34 extends outwardly for attaching to the panel 14 by welding or other suitable means.

Figure 8:
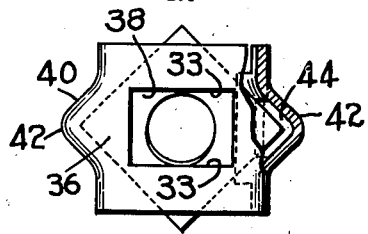
Fig. 8 is a plan view of a nut assembly having certain modifications within the scope of the invention.

Referring now to Fig. 8, there is illustrated another embodiment of the invention, in which a horizontal portion 36 is disposed across the top of the nut, and is provided with an opening 38. A nut retaining wall 40 extends downwardly from each end of the horizontal portion 36, and each wall 40 is provided with a formed out portion 42 which provides an internal recess 44. The nut is so disposed in the cage that diagonally opposite corners project into the recesses to prevent rotation of the nut relative to the cage.

Figure 9:
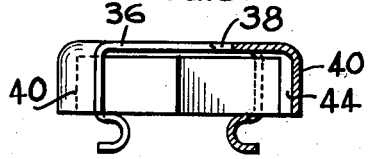
Fig. 9 is a view in elevation, partly in section, of the nut assembly of Fig. 8.

As illustrated in Figs. 8 and 9 hook members may be provided on this embodiment of the cage member to attach the cage to the edges of the opening as previously described. If it is desired to provide for alignment of the nut with a bolt to be inserted therein, the nut may be loosely disposed in the cage, and the hooks shaped and arranged to allow shifting of the cage in the opening as previously described. In this case it is preferable that the opening 38 in the horizontal portion 36 be rectangular, and if desired the dimensions of the opening may be such that an inserted bolt will engage the adjacent edges of the horizontal portion to provide a friction lock therebetween. It will of course be understood that the embodiment of Figs. 8 and 9 may be modified to provide support plates for attaching to the panel, instead of hook members as illustrated.

As illustrated in Figs. 1-3 and 5, in cases where hook members are provided on the cage to permit assembly in a square opening, it has been found desirable to have the nut so assembled in the cage relative to the position of the hook members, that when the cage is assembled in the opening, the nut is disposed diagonally to the opening. When the nut is assembled in this manner, the corners of the nut project over the portion of the supporting panel adjacent the sides of the opening, to provide greater support for the nut when the bolt is tightened therein.

In some cases nuts having a shape other than square may be used; for instance, the cage member may be shaped to receive opposite corners of hexagonal nuts. Means may also be provided for engaging all corners of the nut, although it has been found most economical to provide a cage which engages only two opposite corners, since in this way a minimum amount of metal is required to make the cage member.

Since certain other obvious changes may be made in the device without departing from the scope of the invention, it is intended that all matter contained herein be interpreted in an illustrative, and not in a limiting sense.

I claim:

1. A fastener assembly comprising a cage member and a nut member assembled therein, said nut member comprising a polygonal body having a threaded bolt-receiving opening disposed therein, said cage member comprising a pair of substantially U-shaped strap portions, each having a base portion and opposing leg portions, and a pair of support-engaging portions adapted for securing said cage member to a support panel on opposite sides of an aperture therein, said base portions being disposed in the same plane substantially parallel to each other, overlying a face of said nut member, and providing opposed edges disposed in said plane overlying said bolt-receiving opening to engage and grip the threads of a bolt inserted through said opening in said nut member, the leg portions at each end of said base portions being disposed in the same plane in substantially parallel spaced relationship to each other to provide opposed edges engaging the periphery of said nut member to secure it against rotation and removal, and one of said support-engaging portions integrally connecting at each end of said base portion the ends of said leg portions opposite said base portion.

2. A fastener assembly comprising a cage member and a nut member assembled therein, said nut member comprising a square body having a threaded bolt-receiving opening therein, said cage member comprising a pair of hook members adapted to engage opposite side edges of an aperture in a supporting panel and a pair of spaced substantially U-shaped strap members integrally connecting said hook members, said strap members having base portions disposed in the same plane substantially parallel to each other and extending diagonally over one face of said nut member and leg portions extending downwardly over diagonally opposite corners and providing opposed edges to engage adjacent side faces of said nut member to prevent rotation and removal thereof, said base portions having opposed edge portions in the plane thereof overlying the opening in said nut member to provide a friction lock with a bolt inserted into said opening.

3. A fastener assembly comprising a cage member and a nut member assembled therein, said nut member comprising a square body having a threaded bolt-receiving opening therein, said cage member comprising a pair of plate members adapted for secured attachment to a face of a supporting panel on opposite sides of an aperture therein and a pair of spaced substantially U-shaped strap members integrally connecting said plate members, said strap members having base portions disposed in the same plane substantially parallel to each other and extending diagonally over one face of said nut member and leg portions extending downwardly over diagonally opposite corners and providing opposed edges to engage adjacent side faces of said nut member to prevent rotation and removal thereof, said base portions having opposed edge portions in the plane thereof overlying the opening in said nut member to provide a friction lock with a bolt inserted into said opening.

4. A fastener assembly comprising a cage member and a nut member assembled therein, said nut member comprising a square body having a threaded bolt-receiving opening therein, said cage member comprising a pair of support members adapted for secured attachment to a supporting panel on opposite sides of an aperture therein and a pair of spaced substantially U-shaped strap members integrally connecting said support members, said strap members having base portions disposed in the same plane substantially parallel to each other and extending diagonally over one face of said nut member and leg portions extending downwardly over diagonally opposite corners and providing opposed edges to engage adjacent side faces of said nut member to prevent rotation and removal thereof, said base portions having opposed edge portions in the plane thereof overlying the opening in said nut member to provide a friction lock with a bolt inserted into said opening.

5. A cage member for securing a nut member to an apertured support, said cage member comprising a pair of substantially U-shaped strap portions each having a base portion and opposed leg portions, said base portions being disposed in the same plane in substantially parallel relationship to each other for overlying a face of a nut member and providing opposed spaced edges for overlying a bolt-receiving opening in said nut member and adapted to engage the threads of a bolt inserted therethrough, the leg portions at adjacent ends of said base portions being disposed in spaced-apart substantially parallel relationship to each other providing opposed edges for engagement with adjacent sides of a nut member inserted therebetween, to secure it against rotation and removal, and a pair of support-engaging portions integrally connecting the ends of said leg portions opposite said base portions and adapted to secure said cage member to a support panel on opposite sides of an aperture therein.

6. A cage member in accordance with claim 5 wherein the support-engaging portions comprise hook members for engaging opposite edges of an aperture in a support.

7. A cage member in accordance with claim 5 wherein the support-engaging portions comprise a pair of plate members adapted for secured attachment to a face of a supporting panel on opposite sides of an aperture therein.

WILLIAM A. BEDFORD, Jr.

REFERENCES CITED

The following references are of record in the file of this patent:

UNITED STATES PATENTS

| Number | Name | Date |
| --- | --- | --- |
| 346,452 | Baker | Aug. 3, 1886 |
| 2,073,467 | Demboski et al. | Mar. 9, 1937 |
| 2,078,411 | Richardson | Apr. 27, 1937 |
| 2,079,918 | Mitchell | May 11, 1937 |
| 2,087,113 | Owen | July 13, 1937 |
| 2,255,101 | Burke | Sept. 9, 1941 |
| 2,274,014 | Tinnerman | Feb. 24, 1942 |
| 2,390,752 | Tinnerman | Dec. 11, 1945 |
| 2,391,046 | Tinnerman | Dec. 18, 1945 |
| 2,393,030 | Eggert | Jan 15, 1946 |
| 2,393,054 | Morehouse | Jan. 15, 1946 |
| 2,495,037 | Tinnerman | Jan. 17, 1950 |

FOREIGN PATENTS

| Number | Country | Date |
| --- | --- | --- |
| 580,465 | Great Britain | Sept. 9, 1946 |